W. C. KORTHALS-ALTES.
ALTERNATING CURRENT MOTOR.
APPLICATION FILED FEB. 14, 1918.

1,328,525.

Patented Jan. 20, 1920.
2 SHEETS—SHEET 1.

Inventor:
Willem C. Korthals-Altes,
by Albert G. Davis
His Attorney.

W. C. KORTHALS-ALTES.
ALTERNATING CURRENT MOTOR.
APPLICATION FILED FEB. 14, 1918.

1,328,525.

Patented Jan. 20, 1920.
2 SHEETS—SHEET 2.

Inventor:
Willem C. Korthals-Altes,
by *Albert G. Davis*
His Attorney.

UNITED STATES PATENT OFFICE.

WILLEM C. KORTHALS-ALTES, OF SCHENECTADY, NEW YORK, ASSIGNOR TO GENERAL ELECTRIC COMPANY, A CORPORATION OF NEW YORK.

ALTERNATING-CURRENT MOTOR.

1,328,525.  Specification of Letters Patent.  Patented Jan. 20, 1920.

Application filed February 14, 1918. Serial No. 217,167.

*To all whom it may concern:*

Be it known that I, WILLEM C. KORTHALS-ALTES, a subject of the Queen of the Netherlands, residing at Schenectady, in the county of Schenectady, State of New York, have invented certain new and useful Improvements in Alternating-Current Motors, of which the following is a specification.

My invention relates to alternating current motors of the induction motor type which have a primary winding on the rotor, a secondary on the stator, and also a regulating winding on the rotor in conducting relation with the secondary; such a motor, being disclosed in Reissued Patent #14,031, issued to Schrage, where the regulating winding has generated therein an E. M. F. which is applied to buck or boost the secondary E. M. F. in order to regulate the speed of the motor.

The objects of this invention are to provide an improved arrangement of the windings whereby a more efficient and more readily manufactured motor is produced than was heretofore known.

In arranging the primary and regulating windings on the rotor, in this type of machine, it has been the practice first to put one winding into the slots on the rotor, then independently to add the second. Each slot consequently contained four coil sides which was an expensive and difficult arrangement to manufacture.

In the practice of my invention all these limitations are avoided, because I have arranged the two rotor windings so as to form a mechanically single two-layer winding constructed with coils whose pitch is chosen in a manner which gives a balanced winding for both the primary and regulating windings and a preferably regular winding for the primary; the windings being balanced in the sense that there is no resultant E. M. F. therein tending to produce circulating current.

Figure 10:
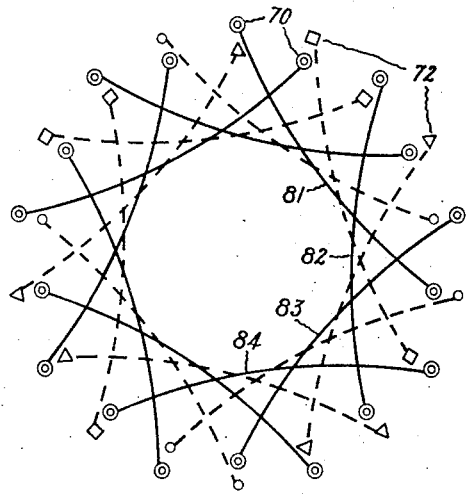
Figure 11:
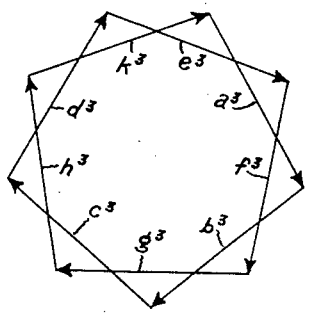
Figure 8:
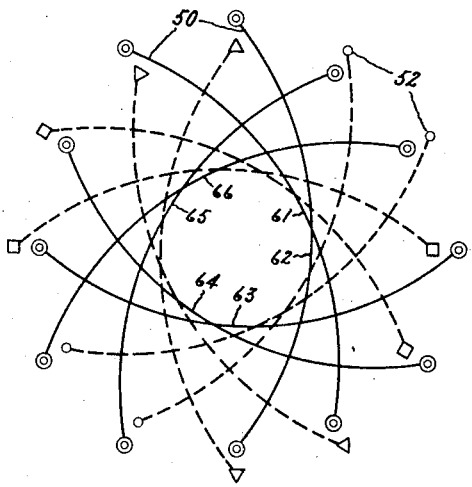
Figure 9:
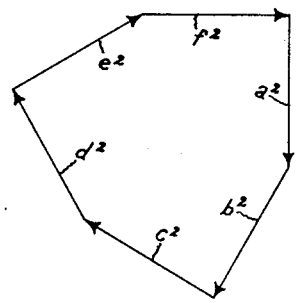

For a more complete understanding of the nature and objects of this invention, reference should be had to the following detailed description taken in connection with the accompanying drawings in which Figure 1 shows, in diagrammatic fashion, the operative relation of the windings in a motor embodying my invention. Fig. 2 is a diagram of the rotor windings suitable for a two pole motor arranged in accordance with my invention while Fig. 3 is a development of this winding and Fig. 4 is an explanatory vector diagram. Fig. 5 is a diagram of a modified arrangement of the rotor windings suitable for a four pole motor arranged in accordance with my invention, Fig. 6 being a partial development thereof, and Fig. 7, a corresponding explanatory vector diagram. Fig. 8 is a diagram showing another modified arrangement of the rotor windings suitable for a motor embodying my invention, Fig. 9 being the corresponding explanatory vector diagram. Fig. 10 is still another modified arrangement of rotor windings and Fig. 11 is the corresponding vector diagram.

Referring now to Fig. 1 of the drawing, A denotes a polyphase source of electric supply which is connected for feeding current to the primary winding P on the rotor of the motor through the collector rings C. The regulating winding R is a commuted winding wound on the rotor and is connected in conducting relation with the secondary winding S, on the stator, through the brushes B which coöperate with and are adjustable on the commutator.

In arranging the regulating winding and the primary winding to form a mechanically single two-layer winding in the rotor slots, it is essential that there shall be one coil-side of each winding in a slot and that the regulating winding in particular shall be a balanced winding in order that there shall be no circulating current to heat the winding and reduce the efficiency of the motor.

This is accomplished by having one side of a component coil lie in an even numbered slot and the other side lie in an odd numbered slot, or in other words, by making the coils span an odd number of slots.

This may obviously be done where the slots per pole is an odd number, but when it is an even number we must either underpitch or over-pitch the coils, or we may treat a group of two or more coils as a single coil and in this manner get a balanced winding.

In addition to being balanced the primary winding is preferably regular with respect to the phases—*i. e.* the sides of the coils carrying the different phases will recur in some predetermined sequence; but this may be departed from within certain limits, which I will presently describe.

The coil-pitch must consequently be so chosen that the following general conditions are satisfied for the primary winding; the coils which are to form the two rotor windings being inserted in the rotor slots so that the leads from every other coil project from the same end of the rotor in order that connections on one end may be made for the primary winding and on the other end, for the regulating winding. These conditions are:

First. The total number of slots ($s$) should be even.

Second. To get a balanced winding, the total number of slots should be divisible by two times the number of phases ($n$); or $$\frac{s}{2n} = \text{an integer.}$$

Third. To get a regular winding, the number of slots per pole should be divisible by the number of phases; or $$\frac{s}{2pn} = \text{an integer,}$$

where $p$ is the number of pairs of poles.

In Figs. 2 and 3, I have illustrated an arrangement of rotor windings suitable for a two pole, three phase motor, in which the coil-pitch has been chosen so as to satisfy the above conditions.

Here the number of slots selected for illustration is twelve, the slots per pole then being six. This number of slots is divisible by six (twice the number of phases), and the number of slots per pole is also divisible by three, (the number of phases). The conditions for a balanced regulating and regular balanced primary windings are consequently met. In order to have the coil sides lying in even and odd numbered slots, the coils are pitched to span five slots.

A side of one of the coils 10 comprising the regulating winding designated by the double circle (also shown by full lines) lies in each slot on the rotor; alternate coils having their sides in the inner and outer circles respectively. The coils of this winding are six in number denoted 21, 22, 23, etc. and have their terminals projecting from the same end of the rotor and are joined to the commutator bars 11, shown in Fig. 3, as in an ordinary D. C. armature winding.

The other coil side in each slot of the rotor is a side of one of the coils comprising the polyphase primary winding 12 (also shown by broken lines) the three phases of which are denoted by a square, triangle and circle respectively.

The terminals of the coils 12 all project from the other end of the rotor and may be connected either star or mesh; that shown being a star connection having a neutral point 13 and the leads 14, 15 and 16 leading respectively to the collector rings.

That both the primary and regulating windings here shown are balanced windings may be readily seen, if we consider the resultant E. M. F. tending to circulate current in the winding when taken as a closed circuit.

In each of the six coils, which compose these windings, there is induced an E. M. F. whose instantaneous direction may be indicated by a vector drawn tangent to the middle point of the arc spanning the two sides of the coils. The six vectors which are so drawn are for the regulating coils 21, 22, 23, 24, 25 and 26 are designated respectively $a$, $b$, $c$, $d$, $e$, and $f$ in Fig. 4. These six vectors are seen to form a closed figure so that the geometric sum and consequently the resultant E. M. F. is zero.

That the winding 12 is a regular winding is also seen, since there are two conductors per phase for each pole of the machine.

In Figs. 5 and 6, I have shown an arrangement of primary and regulating windings in a sixteen slot rotor adapted for a four pole, two-phase motor.

Here the number of slots per pole is four, which is divisible by two (the number of phases), while sixteen is divisible by twice the number of phases or four.

The conditions for balanced and regular windings being fulfilled, and seeing that the slots per pole is again an even number, over-pitched coils are here employed in order that the coil sides may lie in even and odd numbered slots.

The coils are here shown as spanning five slots; double circles and full lines being employed to denote the regulating winding 30 and broken lines being employed to denote the primary winding 32, the two phases being denoted by squares and triangles respectively.

In order to determine graphically whether there is a resultant E. M. F. to force a circulating current about either the regulating or primary winding considered as a closed network, I shall again draw a vector diagram.

The vector $a'$ in Fig. 7 is drawn to represent the instantaneous value of the E. M. F. in coil 41 of the regulating winding; the vector $b'$, $c'$, and $d'$ corresponding to coils 42, 43 and 44 respectively. Since the motor is a four pole motor, the instantaneous value of the E. M. F. in coil 45 would be coincident with vector $a'$, the instantaneous E. M. F. for the remaining three coils being similarly coincident with the other vectors.

This E. M. F. diagram being a closed figure there is obviously no resultant or circulating E. M. F. so that we again have a balanced winding.

In Fig. 8 I have illustrated another arrangement of coils for a twelve slot rotor suitable for a two-pole, three phase motor. Instead of under-pitching or over-pitching the coils in order to have the coil-sides lie respectively in even numbered and odd numbered slots, I have used full pitch coils and treated two coils as one. The coils are consequently each shown as spanning six slots.

The regulating winding 50 is shown by double circles and also by full lines. Instead of putting in alternate coils of the regulating and primary winding as in the arrangements described above, I put in two full-pitch coils 61 and 62 in two adjacent slots, since we are treating two coils as one. In the next two slots are placed two coils of the primary winding 52 which are in turn followed by two more coils 63 and 64 of the regulating winding, and so on.

The three phases of the primary winding are denoted by the square, triangle and circle as in the other figures.

In Fig. 9 I have again indicated the graphical determination of the resultant E. M. F. for this arrangement of coils which is to force a circulating current in either the primary or regulating winding network.

Considering specifically the regulating winding we might draw one resultant vector for the E. M. F. of the coils 61 and 62 since they are treated as one coil having what may be termed a "group-pitch" of three; but since the E. M. F. in these two coils differ slightly in phase, they are indicated separately. The vector $a^2$ is accordingly drawn to denote the instantaneous E. M. F. in the coil 61 and vector $b^2$ for that in coil 62. In like manner the vectors $c^2$ and $d^2$ denote the E. M. F.'s in the coils 63 and 64 and vectors $e^2$ and $f^2$ denote the E. M. F.'s in coils 65 and 66.

Here again the vector E. M. F.'s form a closed figure so that there is no resultant and the windings are balanced windings.

In Fig. 10, I have shown an arrangement of windings in an eighteen slot rotor adapted for a four pole, three-phase motor.

Here the slots per pole is four and one half or a mixed number. If this quotient can be multiplied by an integer which is equal to or is a multiple of the number of pairs of poles so as to get a whole number we can still have a balanced winding from the group of coils indicated by this number.

The integer 2 which is derived from the number of pairs of poles satisfies this requirement for $$2(4+\tfrac{1}{2})=9.$$

If the integer, in question, were taken as a multiple of the number of pairs of poles, the grouping of the coils should be in multiple, equalizer connections being employed to connect the groups in this manner.

In order to have the coils span an odd number of slots, the coil pitch is here taken as five.

While it is seen that the first two of the above conditions are satisfied so that we can have balanced windings in both the regulating winding 70 and the primary winding 72, the third is not satisfied so that we have an irregular primary winding as the result; the slots per phase, per pole being one and one half.

This irregularity is compensated for by adding an extra conductor of one phase for each pole; the phases being selected in cyclic order, as illustrated; the squares, triangles and circles each denoting one of the three phases.

Considering now the resultant or circulating E. M. F., the vectors $a^3$, $b^3$, $c^3$, etc., to $k^3$ are drawn to represent graphically the instantaneous E. M. F. in the coils 81, 82, 83, etc.

Here again a closed figure is formed so that we have no resultant E. M. F., and consequently balanced windings.

While I have here shown and described several embodiments of my invention which are, at present, the best means known to me for carrying the same into effect, I would have it understood that they are merely illustrative and that I do not mean to be limited thereby to the precise details shown, nor in the choice of equivalent arrangements except as defined in my claims hereunto annexed.

What I claim as new and desire to secure by Letters Patent of the United States, is:—

1. An alternating current motor, comprising a stator having a secondary winding, a slotted rotor having a primary winding, and a regulating winding in conducting relation with said secondary winding; said primary and regulating windings being arranged in the rotor slots to form a mechanically single two-layer balanced winding.

2. An alternating current motor, comprising a stator having a secondary winding, a slotted rotor having a primary winding, and a regulating winding in conducting relation with said secondary winding; said primary and regulating windings consisting of uniform coils pitched to span an odd number of slots arranged on said rotor to form a mechanically single two-layer winding.

3. An alternating current motor, comprising a stator having a secondary winding, a slotted rotor having a primary winding, and a regulating winding in conducting relation with said secondary winding; said primary and regulating windings consisting of uniform coils arranged so that there is one coil-side of each winding in each rotor slot.

4. An alternating current motor, comprising a stator having a secondary winding, a slotted rotor having a primary winding, and a regulating winding in conducting relation with said secondary winding; said primary and regulating windings each consisting of uniform coils inserted in alternate rotor slots, the connections for each winding being made on separate ends of said rotor.

5. An alternating current motor, comprising a stator having a secondary winding, a slotted rotor having a primary winding, and a regulating winding in conducting relation with said secondary winding; said rotor having an even number of slots which is a multiple of both the number of poles and the number of phases in the motor and having said primary and regulating windings inserted therein so as to form a mechanically single two-layer winding.

6. An alternating current motor, comprising a stator having a secondary winding, a slotted rotor having a primary winding, and a regulating winding in conducting relation with said secondary winding; said rotor having an even number of slots which is a multiple of both the number of poles and the number of phases in the motor and carrying uniform coils pitched to span an odd number of slots, each alternate coil being connected on the same end of the rotor, to form separate primary and regulating windings.

7. An alternating current motor comprising a stator having a secondary winding, a slotted rotor carrying primary and regulating windings and a commutator, and coöperating brushes on said commutator in conducting relation with said secondary winding; said primary and regulating windings being arranged in the rotor slots to form a mechanically single two-layer winding, said regulating winding being electrically connected to said commutator.

8. An alternating current motor comprising a stator having a secondary winding, a slotted rotor carrying primary and regulating windings and a commutator, and coöperating brushes on said commutator in conducting relation with said secondary winding; said primary and regulating windings consisting of uniform coils pitched to span an odd number of slots arranged on said rotor to form a mechanically single two-layer winding having the regulating winding electrically connected to said commutator.

9. An alternating current motor comprising a stator having a secondary winding, a slotted rotor carrying primary and regulating windings and a commutator, and coöperating brushes on said commutator in conducting relation with said secondary winding; said rotor having an even number of slots which is a multiple of both the number of poles and the number of phases in the motor and carrying uniform coils inserted as a mechanically single two-layer winding electrically connected to form said primary and regulating windings.

10. An alternating current motor comprising a stator having a secondary winding, a slotted rotor carrying primary and regulating windings and a commutator, and coöperating brushes on said commutator in conducting relation with said secondary winding; said rotor having an even number of slots which is a multiple of both the number of poles and the number of phases in the motor and carrying uniform coils each spanning an odd number of slots, alternate coils being electrically connected on separate ends of said rotor to form said primary and regulating windings, the regulating winding being connected through said commutator.

In witness whereof I have hereunto set my hand this 13th day of February, 1918.

WILLEM C. KORTHALS-ALTES.